(12) United States Patent
Buch et al.

(10) Patent No.: US 7,114,011 B2
(45) Date of Patent: Sep. 26, 2006

(54) MULTIPROCESSOR-SCALABLE STREAMING DATA SERVER ARRANGEMENT

(75) Inventors: Deep K. Buch, Folsom, CA (US); Zhenjun Hu, Folsom, CA (US); Neil Schaper, Folsom, CA (US); David Zhao, Rancho Cordova, CA (US); Vladimir M. Pentkovski, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 09/941,702

(22) Filed: Aug. 30, 2001

(65) Prior Publication Data

US 2003/0046511 A1 Mar. 6, 2003

(51) Int. Cl.
*G06F 15/16* (2006.01)

(52) U.S. Cl. .............. 709/250; 709/231; 709/248; 709/223; 710/52; 710/56; 719/321

(58) Field of Classification Search ........ 709/217–219, 709/250, 200, 201, 213, 223, 231, 248; 710/107, 710/52, 56; 719/321
See application file for complete search history.

(56) References Cited

U.S. PATENT DOCUMENTS

| | | | |
|---|---|---|---|
| 5,745,778 A | 4/1998 | Alfieri | |
| 5,815,662 A | 9/1998 | Ong | |
| 5,928,330 A | 7/1999 | Goetz et al. | |
| 5,978,843 A | 11/1999 | Wu et al. | |
| 6,032,200 A | 2/2000 | Lin | |
| 6,052,513 A * | 4/2000 | MacLaren | 710/114 |
| 6,081,846 A * | 6/2000 | Hyder et al. | 709/250 |
| 6,272,522 B1 * | 8/2001 | Lin et al. | 709/200 |
| 6,510,164 B1 * | 1/2003 | Ramaswamy et al. | 370/466 |
| 6,510,479 B1 * | 1/2003 | Hao | 710/240 |
| 2001/0027496 A1 * | 10/2001 | Boucher et al. | 709/250 |
| 2002/0007443 A1 * | 1/2002 | Gharachorloo et al. | 711/141 |
| 2002/0118638 A1 * | 8/2002 | Donahue et al. | 370/229 |

OTHER PUBLICATIONS

NEC Japan, Microsoft® Japan, ASCII NT Announce AMD Athlon™ Processor To Power Commercial "InternetStreamingServer" http://www.amd.com/news/prodpr/2174.html.
Streaming methods: Web Server vs Streaming Media Server, Microsoft While Paper http://www.microsoft.com/NTServer/mediaserv/exec/comparison/WebServVStreamServ.asp.
Windows Media Load Simulator—http://msdn.microsoft.com/workshop/imedia/windowsmedia/LoadSim.asp.

* cited by examiner

*Primary Examiner*—Jeffrey Pwu
(74) *Attorney, Agent, or Firm*—Paul E. Steiner

(57) ABSTRACT

A multiprocessor-scalable streaming data server arrangement in a multiprocessor data server having N processors, N being an integer greater than or equal to 2, includes implementing N NICs (Network Interface Cards), a first one of the N NICs being dedicated to receiving an incoming data stream. An interrupt from the first one of the N NICs is bound to a first one of the N processors and an interrupt for an nth NIC is bound to an nth processor, $0<n<=N$. A DPC (Deferred Procedure Call) for the nth NIC is bound to the nth processor. M client connections may be tightly coupled to the nth processor via the nth NIC, M being a positive integer. P server threads may be bound to specific ones of a second through N processors. L1 (Level 1) and L2 (Level 2) caches may be defined for each of the N processors, instructions and temporal data being stored in L2 caches of the N processors and non-temporal data being stored in L1 caches of the N processors, bypassing the L2 caches.

38 Claims, 4 Drawing Sheets

RELATED ART

MULTIPROCESSOR-SCALABLE STREAMING DATA SERVER ARRANGEMENT

FIELD

The present invention is directed to streaming data server arrangements. More particularly, the present invention is directed to a multiprocessor-scalable streaming data server arrangement.

BACKGROUND

One application area for servers is to provide streaming data over the Internet or over a corporate intranet. The streaming data may consist of multimedia data (e.g.—audio/video), character streams (e.g.—stock quotes), etc. On-demand content refers to the streaming of specific client-requested data files whereas broadcast content refers to content delivered from a source, such as an encoder system, onto an incoming network link, and streamed out to thousands of clients over a set of outgoing network links.

It is been found through measurements that currently used multiprocessor servers have poor SMP (Symmetric Multi-Processing) scalability. In most cases, the processor is the performance limiter. In such processor-bound cases using processors having 2 MB L2 caches, the following was noted:

A very high CPI (Clocks per Instruction retired) was noted with measured CPI ranges of between 4.0 and 6.0, which is considerably above the average for most server applications.

A very high L2 MPI (Level 2 Cache Misses per Instruction retired) was noted with measured L2 MPI's in the range of 2% to 4%. This indicates that on the average, 3 out of every 100 instructions results in an L2 miss.

A saturated front-side bus was noted. That is, performance counters show that the data bus is actively transferring data 40% of the time. When accounting for the read/write transaction mix, bus efficiency, and MP arbitration, this indicates that the front-side bus is close to being saturated.

The raw data bandwidth requirements for streaming are typically much lower than the capabilities of the system and the I/O buses. Thus, the observed saturation of the bus clearly indicates that there is a large overhead of unnecessary data transfers.

It has been found that poor scalability of such systems are due to the following factors:

Interrupt/DPC (Deferred Procedure Call) Migration: Hardware interrupts from the NIC (Network Interface Cards) are routed to any available processor by the OS (Operating System). The DPC handler, which is set up by the OS, is executed in turn by some other processor.

Loosely-coupled Connection Processing: Client connections are processed by different processors during connection lifetimes. The same processors process both input and output streams.

Thread and Buffer Migration: The threads of the server process are not bound to any specific processor. Thus, during the course of transferring data between input and output buffers, the server thread runs on different processors at different times. This migration of threads leads to the pollution of the processor caches, since the same buffer ping-pongs around between processors.

Inefficient L2 Cache Utilization: The large L2 processor caches are not properly utilized. The nature of streaming data is non-temporal, that is, the data is used only once and never used again, thus, the caching of this data serves no useful purpose and yet the data is loaded into the L2 caches. Since the threads write to the data buffers in order to extract/append network protocol headers, this leads to dirty write-backs when the next incoming buffer is accessed by a processor.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
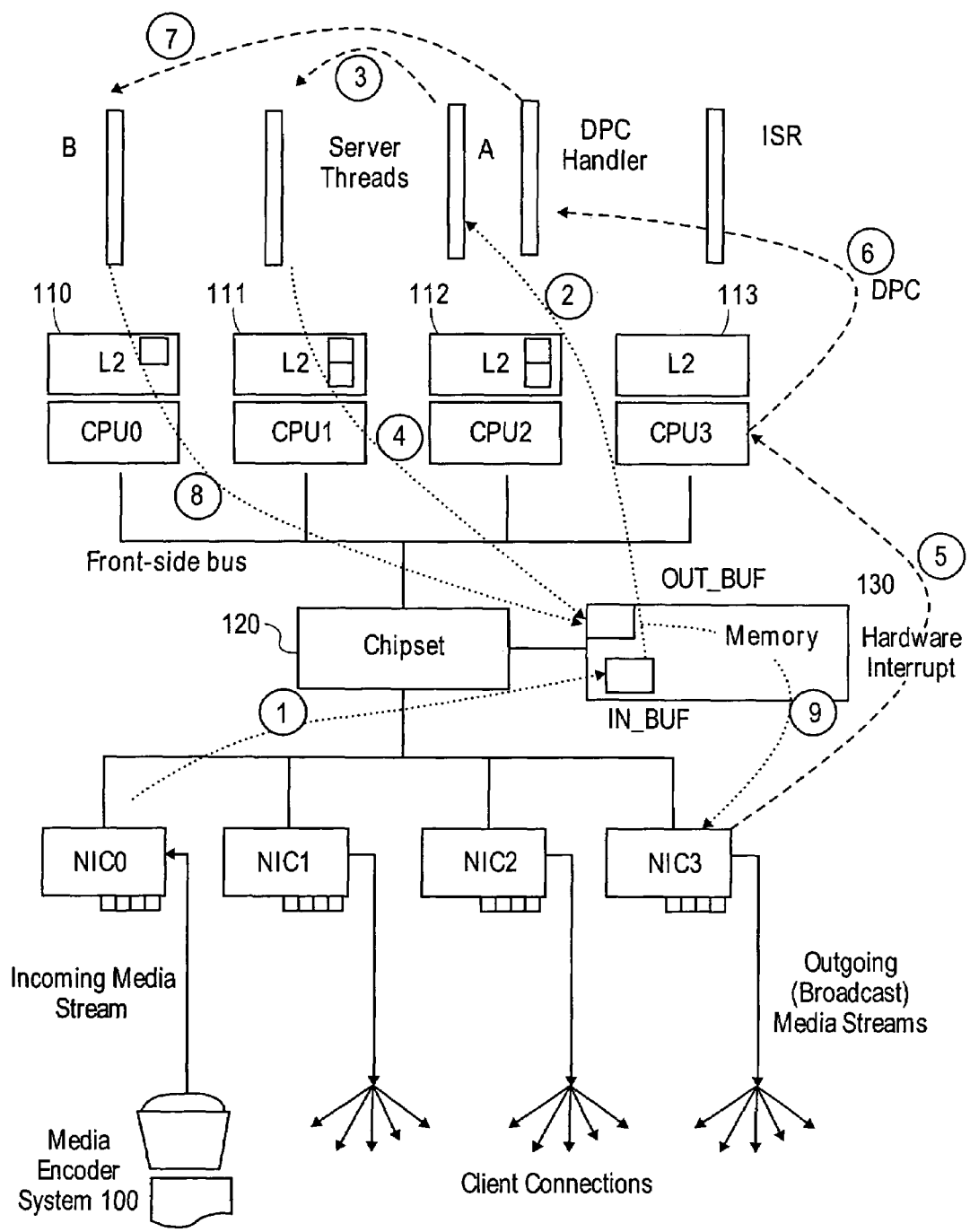
FIG. 1 illustrates an example arrangement of a multiprocessor scalable streaming data server.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Arrangements may be shown in block diagram form in order to avoid obscuring the invention and also in view of the fact that specifics with respect to implementation of such block diagram arrangements are highly dependent upon the platform within which the present invention is to be implemented, that is, such specifics should be well within the purview of one skilled in the art. Where specific details are set forth in order to describe example embodiments of the invention, it should be apparent to one skilled in the art that the invention can be practiced without, or with variations of, the specific details. Still furthermore, well-known elements have been omitted from the drawing figures so as not to obscure the invention. Lastly, it should be apparent that differing combinations of hard-wired circuitry and software instructions can be used to implement embodiments of the present invention, that is, the present invention is not limited to any specific combination of hardware and software.

FIG. 1 illustrates an example arrangement of a multiprocessor scalable streaming data server. As shown in FIG. 1, a chipset 120 and memory 130, having both in input buffer IN_BUF and an output buffer OUT_BUF, are connected via an I/O bus to a plurality of network interface cards NIC0–NIC3 and are also connected via a front-side bus to a plurality of processors CPU0–CPU3. The plurality of processors each have respective L2 caches 110–113.

As shown in FIG. 1, in step 1, incoming streaming data is transferred to the input buffer IN_BUF by the network interface card NIC0, the incoming streaming data, for example, consisting of an incoming media stream from a media encoder system 100. In step 2, a server thread A on processor CPU2 reads data out of the in buffer IN_BUF. In step 3, the server thread A is next scheduled to run on processor CPU1, resulting in an example of thread/buffer migration. In step 4, the server thread A copies data to output buffer OUT_BUF, resulting in an example of inefficient L2 cache utilization. In step 5, network output card NIC3 generates a hardware interrupt which is serviced by an ISR (Interrupt Service Routine) running on the processor CPU3 and a DPC callback is registered. In step 6, the DPC handler is executed on processor CPU2, resulting in interrupt/DPC migration. In step 7, the DPC handler invokes server thread B, which runs on processor CPU0. In step 8, the server thread B completes packet assembly and marks output buffer OUT_BUF ready for network input card NIC3 to read. Lastly, in step 9, the network card NIC3 reads data out of the output buffer OUT_BUF and streams the data to the clients.

Thus, the disadvantageous example arrangement of FIG. 1 suffers from poor scalability due to the four factors noted above in the Background. To improve scalability, the present invention includes one or more of the following features:

Interrupt/DPC Binding: In the present invention, the number of network interface cards is equal to the number of processors which is equal to N. Interrupts from the network interface card that handles the incoming data stream are bound to a single processor CPU0. Interrupts for network interface card NICn are bound to respective processor CPUn where 0<n<=N. The DPC for network interface card NICn is also bound to processor CPUn where 0<=n<=N. This obviates the interrupt/DPC migration problem.

Tightly-coupled Connection Processing: In the present invention, given a set of client connections C0–CM, the client connections are tightly coupled to specific processors except for processor CPU0 which is reserved for input stream processing. For example, connections C0 to CM/(N–1) are assigned to processor CPU1, etc. This obviates the loosely-coupled connection processing problem.

Thread and Buffer Affinity: In the present invention, given a set of server threads T0 to Tp which access and process streaming data buffers, these server threads are bound to specific processors except for processor CPU0 (which is reserved for input stream processing). This is effected using thread affinity API calls. For example, in Windows, the SetThreadAffinityMask( ) call may be used. For example, threads T0 to Tp/(N–1) are bound to processor CPU1, etc. This also ensures that buffers corresponding to a thread are processed only by the processor to which the thread is bound. This obviates the thread and buffer migration problem.

Efficient L2 Cache Utilization with SSE Non-temporal Prefetch and Streaming Store Instructions: In the present invention, with regard to instructions, since the code for the data server threads does not change, the instructions can be allowed to be cached in the L2 caches of the processors. With regard to temporal data, section data associated with client connections is temporal and can be allowed to be cached in the L2 caches of the processors. With regard to non-temporal data, streaming data is non-temporal and is therefore not cached in the L2 caches of the processors. Rather, the data is inputted to the lowest level cache, that is, the L2 cache, using, for example, the prefetchnta instruction to the SSE. Packet assembly is effected in the L2 cache and the finished packet is inputted to the memory buffer using, for example, the movntq streaming store instruction outputted by the MMx registers. This obviates the inefficient L2 cache utilization problem.

Efficient L2 Cache Utilization: In the present invention, the L2 cache efficiency may be improved by increasing the amount of time allotted to the server threads which process streaming buffers.

Figure 2:
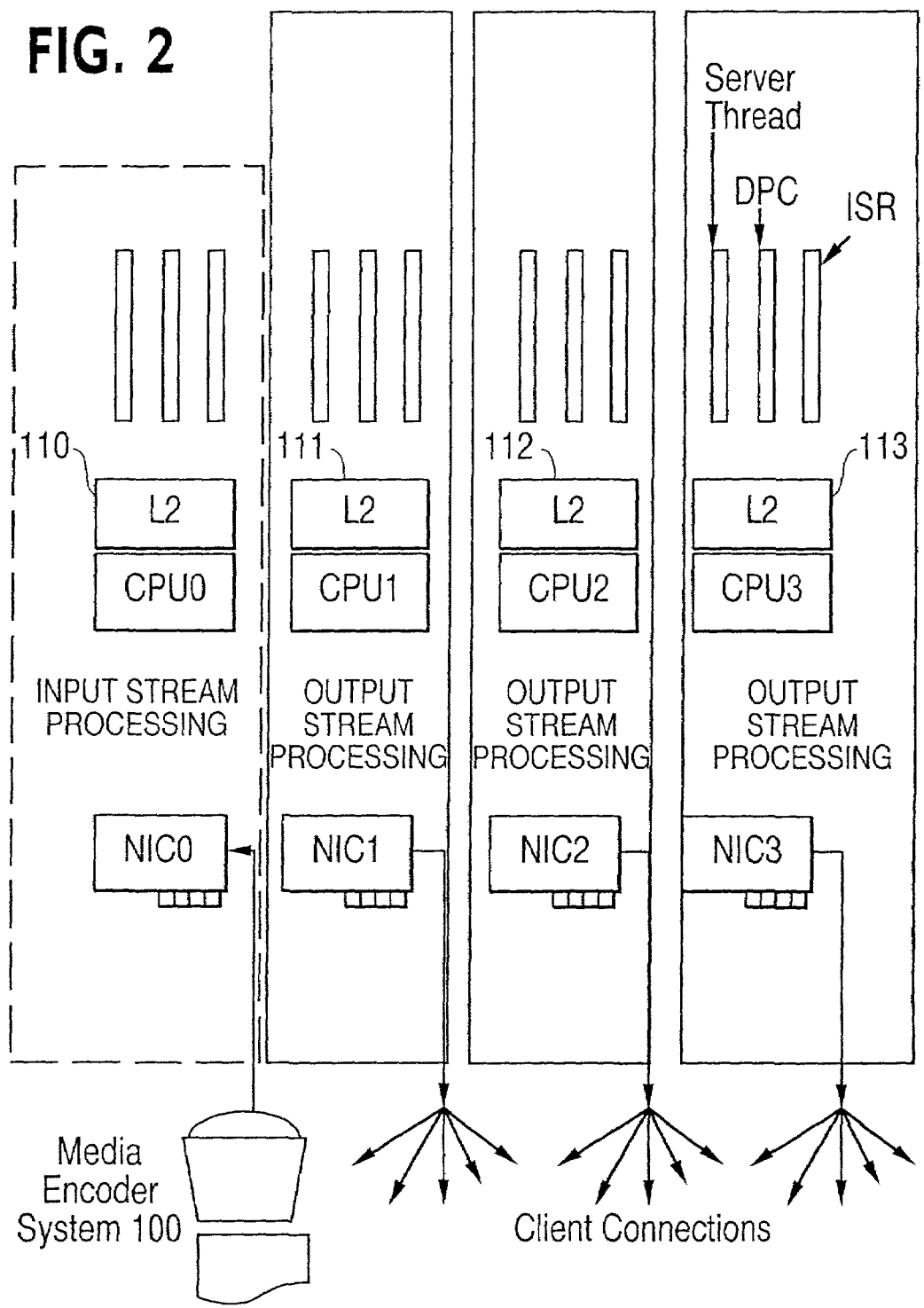
FIG. 2 illustrates tightly-coupled connection processing, interrupt/DPC binding, and thread/buffer affinity.

FIG. 2 illustrates the tightly-coupled connection processing, interrupt/DPC binding, and thread/buffer affinity features of the present invention. As illustrated FIG. 2, network interface card NIC0, which is bound to processor CPU0, along with L2 cache 110, are reserved for input stream processing of data from the media encoder system 100. The processor CPU0 has its server thread, DPC, and ISR bound thereto to ensure thread and buffer affinity. Similarly, processors CPU1-CPU3 are bound to respective network interface cards NIC1–NIC3 to ensure interrupt/DPC binding. The processors CPU1–CPU3 also have their respective server threads, DPC's, and ISR's bound thereto. Furthermore, the network interface cards NIC1–NIC3 are respectively dedicated to specific client connections to ensure tightly-coupled connection processing.

Figure 3:
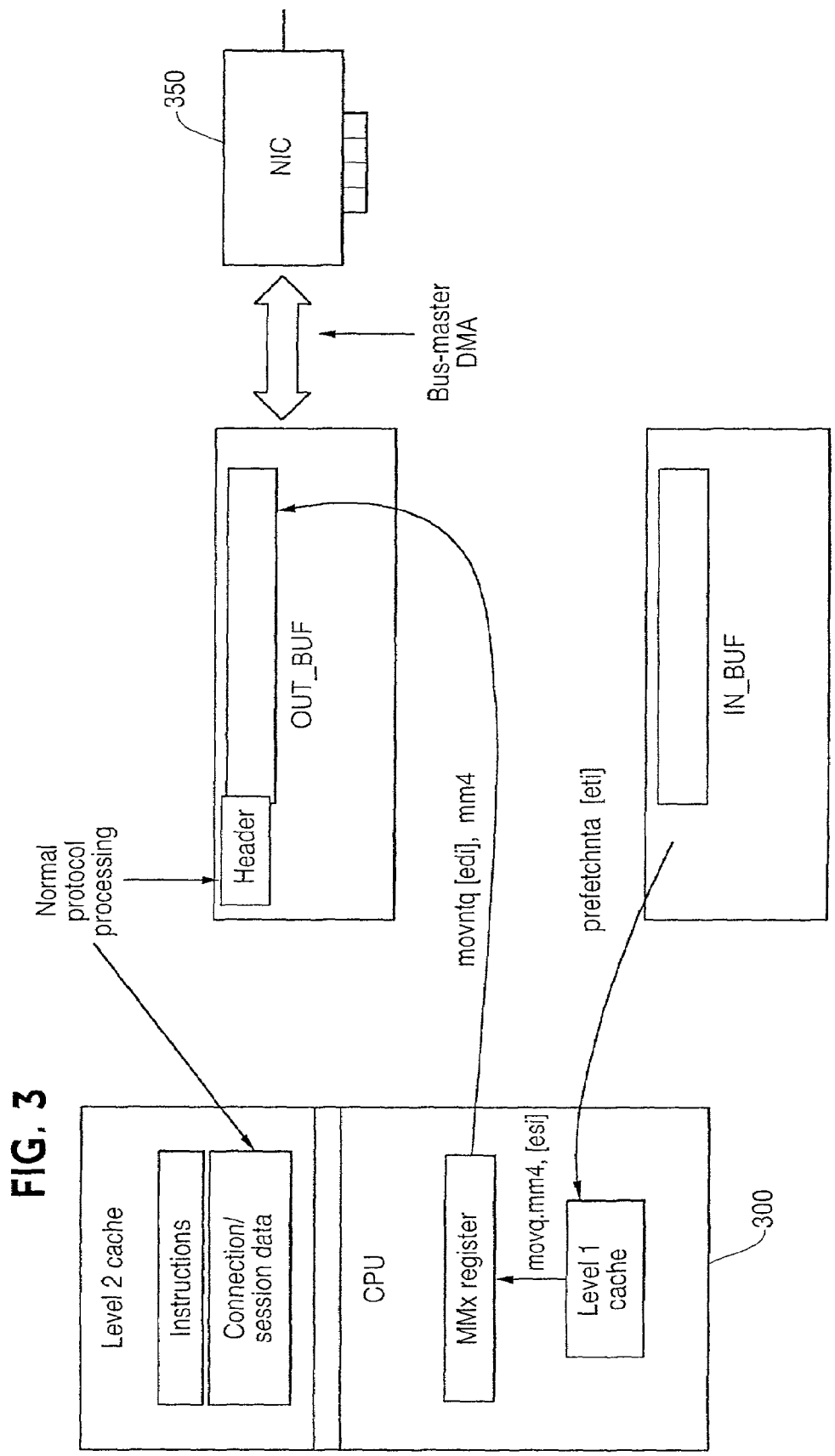
FIG. 3 illustrates improved L2 cache utilization using SSE (Streaming SIMD Extensions).

FIG. 3 illustrates improved L2 cache utilization using SSE. As illustrated in FIG. 3, a processor 300 includes a level 1 (L1) cache and an MMx register as well as a level 2 (L2) cache. Data from the input buffer IN_BUF is inputted to the level 1 cache and data is output from the MMx register to the output buffer OUT_BUF. Data is transferred between the output buffer OUT_BUF and a network interface card 350 via a Bus-master DMA. As shown in FIG. 3, the non-temporal streaming data completely bypasses the L2 cache. The prefetchnta instruction is used to input the data directly from the input buffer IN_BUF into the L2 cache. This is followed by a regular movq instruction to load the data into an MMx register. Then, the movntq instruction is used to output data from the MMx register into the output buffer OUT_BUF. This sequence of steps may be disposed within a software loop to copy the streaming data directly from the input buffer IN_BUF to the output buffer OUT_BUF. The number of words moved per loop iteration can be optimized for a particular processor microarchitecture.

The L2 cache is used to store instructions and temporal data, such as session state and connection management information. The UDP and IP headers for outgoing packets are prefixed to the data in the output buffer OUT_BUF in the usual way.

Figure 4:
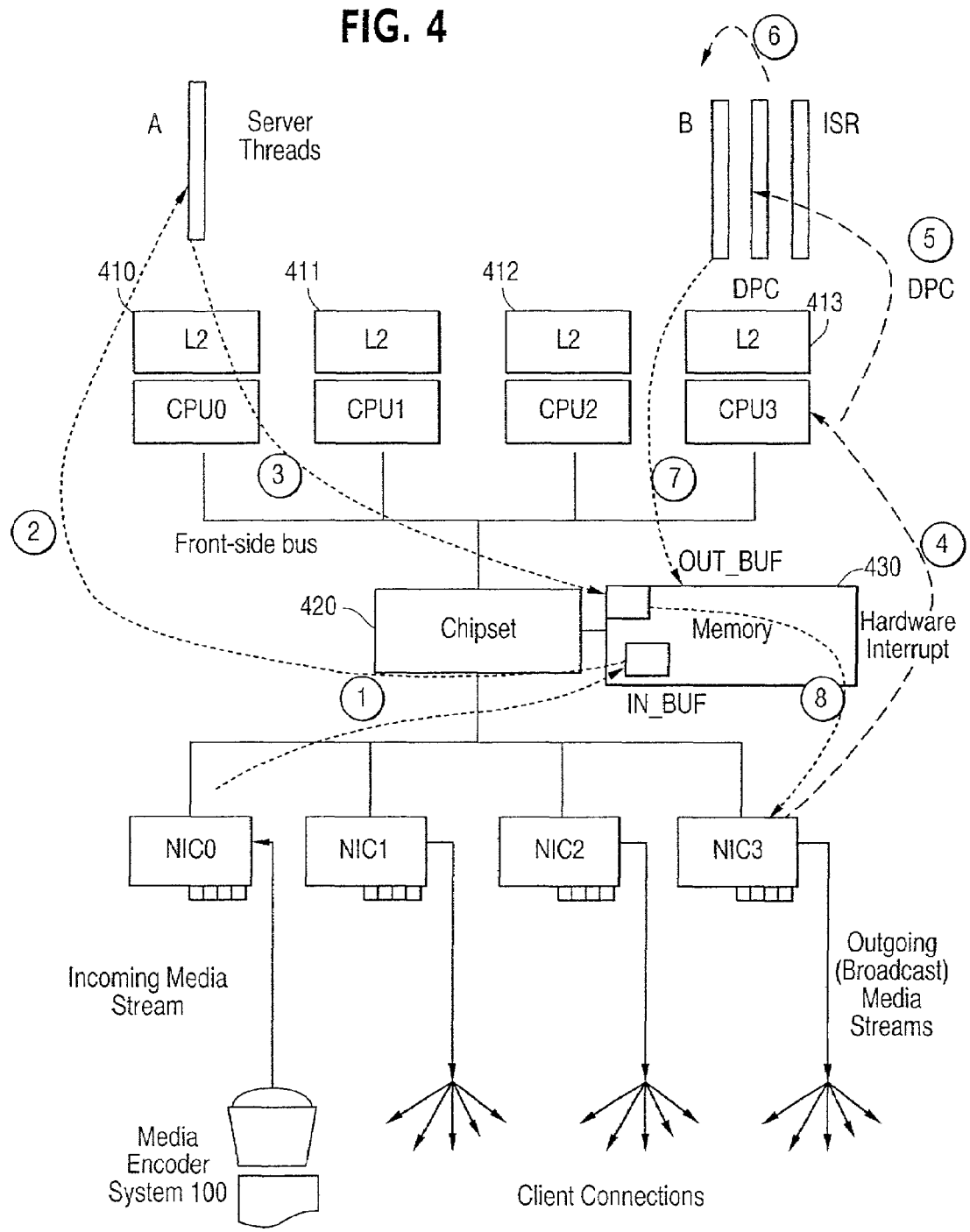
FIG. 4 illustrates an example arrangement of a multi-scalable streaming data server in accordance with an embodiment of the present invention.

FIG. 4 illustrates an example arrangement of a multi-scalable streaming data server in accordance with the embodiment of the present invention. As illustrated in FIG. 4, the various elements can be easily seen as corresponding to their respective elements in FIG. 1. In step 1 of FIG. 4, incoming streaming data is transferred to the input buffer IN_BUF of the memory 430 by the network interface card NIC0. In step 2, the server thread A of the processor CPU0 reads data out of the input buffer IN_BUF using a non-temporal prefetch (bypassing the L2 cache 410). In step 3, the server thread A copy's data to the output buffer OUT_BUF, (a streaming store which bypasses the L2 cache 410 and therefore results in efficient L2 cache utilization). In step 4, the network interface card NIC3 generates a hardware interrupt which is serviced by the processor CPU3 and the DPC callback is registered. In step 5, the DPC handler actually executes on the processor CPU3 (interrupt/DPC binding). In step 6, the DPC handler invokes server thread B which runs on processor CPU3 (server thread/buffer affinity). In step 7, the server thread B completes packet assembly and locks the output buffer OUT_BUF ready for the network interface card NIC3 to read. Lastly, in step 8, the network interface card NIC3 reads data out of the output buffer OUT_BUF and streams it to the clients connected thereto.

The impact of the above-noted features of the present invention is that the bottlenecks that limit scalability are effectively removed. Front-side bus utilization is greatly reduced by limiting the overheads of buffer migration. Cache efficiency also improves due to greatly reduced L2 MPI and the processing efficiency, as measured by CPI, also improves. Since each processing unit (consisting of a processor and its respective network interface card) is almost independent, the multiprocessor scalability also improves significantly.

This concludes the description of the example embodiment. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will be apparent to those skilled in the art.

The invention claimed is:

1. A method of optimizing scalability in a multiprocessor data server having N processors, wherein N is an integer greater than or equal to 2, the method comprising:
   implementing N network interface cards (NICs), a first one of the N NICs being dedicated to receiving an incoming data stream;
   binding an interrupt from the first one of the N NICs to a first one of the N processors;
   binding an interrupt for an nth NIC to an nth processor, wherein $0<n<=N$; and
   binding a deferred procedure call (DPC) for the nth NIC to the nth processor, wherein $0<n<=N$.

2. The method of claim 1, further comprising tightly coupling M client connections to the nth processor via the nth NIC, wherein M is a positive integer.

3. The method of claim 1, further comprising binding P server threads to specific ones of the second through Nth processors, wherein P is a positive integer.

4. The method of claim 2, further comprising binding P server threads to specific ones of the second through Nth processors, wherein P is a positive integer.

5. The method of claim 1, further comprising:
   defining first and second level caches for each of the N processors;
   storing instructions and temporal data in second level caches of the N processors; and
   storing non-temporal data in first level caches of the N processors, bypassing the second level caches.

6. The method of claim 2, further comprising:
   defining first and second level caches for each of the N processors;
   storing instructions and temporal data in second level caches of the N processors; and
   storing non-temporal data in first level caches of the N processors, bypassing the second level caches.

7. The method of claim 3, further comprising:
   defining first and second level caches for each of the N processors;
   storing instructions and temporal data in second level caches of the N processors; and
   storing non-temporal data in first level caches of the N processors, bypassing the second level caches.

8. The method of claim 4, further comprising:
   defining first and second level caches for each of the N processors;
   storing instructions and temporal data in second level caches of the N processors; and
   storing non-temporal data in first level caches of the N processors, bypassing the second level caches.

9. A method of providing scalability in a multiprocessor data server having N processors, wherein N is an integer greater than or equal to 2, the method comprising:
   implementing N network interface cards (NICs);
   dedicating a first one of said N NICs to receiving an incoming data stream;
   tightly coupling M client connections to the nth processor via the nth NIC, wherein M is a positive integer and wherein $0<n<=N$; and
   binding an interrupt from the first one of said N NICs to a first one of said N processors.

10. The method of claim 9, further comprising binding P server threads to specific ones of second through N processors, wherein P is a positive integer.

11. The method of claim 10, further comprising:
    defining first and second level caches for each of the N processors;
    storing instructions and temporal data in second level caches of the N processors; and
    storing non-temporal data in first level caches of the N processors, bypassing the second level caches.

12. The method of claim 9, further comprising:
    defining first and second level caches for each of the N processors;
    storing instructions and temporal data in second level caches of the N processors; and
    storing non-temporal data in first level caches of the N processors, bypassing the second level caches.

13. A method of providing scalability in a multiprocessor data server having N processors, wherein N is an integer greater than or equal to 2, the method comprising:
    implementing N network interface cards (NICs);
    dedicating a first one of said N NICs to receiving an incoming data stream;
    binding an interrupt from the first one of said N NICs to a first one of said N processors; and
    binding P server threads to specific ones of the second through Nth processors.

14. The method of claim 13, further comprising:
    defining first and second level caches for each of the N processors;
    storing instructions and temporal data in second level caches of the N processors; and
    storing non-temporal data in first level caches of the N processors, bypassing the second level caches.

15. A method of providing scalability in a multiprocessor data server having N processors, wherein N is an integer greater than or equal to 2, the method comprising:
    implementing first and second level caches for each of the N processors;
    storing instructions and temporal data in second level caches of the N processors; and
    storing non-temporal data in first level caches of the N processors, bypassing the second level caches.

16. The method of claim 5, further comprising improving first level cache efficiency by increasing a time quantum allotted to server threads which process streaming data buffers.

17. The method of claim 6, further comprising improving first level cache efficiency by increasing a time quantum allotted to server threads which process streaming data buffers.

18. The method of claim 7, further comprising improving first level cache efficiency by increasing a time quantum allotted to server threads which process streaming data buffers.

19. The method of claim 8, further comprising improving first level cache efficiency by increasing a time quantum allotted to server threads which process streaming data buffers.

20. The method of claim 11, further comprising improving first level cache efficiency by increasing a time quantum allotted to server threads which process streaming data buffers.

21. The method of claim 14, further comprising improving first level cache efficiency by increasing a time quantum allotted to server threads which process streaming data buffers.

22. The method of claim 15, further comprising improving first level cache efficiency by increasing a time quantum allotted to server threads which process streaming data buffers.

23. A multiprocessor data server comprising:
N processors, wherein N is an integer greater than or equal to 2;
N network interface cards (NICs), a first one of said N NICs being dedicated to receiving an incoming data stream;
wherein an interrupt from the first one of said N NICs is bound to a first one of said N processors; and
wherein an interrupt for an nth NIC is bound to an nth processor, 0<n<=N; and
wherein a deferred procedure call (DPC) for said nth NIC is bound to said nth processor.

24. The multiprocessor data server of claim 23, further comprising M client connections, wherein said M client connections are tightly coupled to said nth processor via said nth NIC, M being a positive integer.

25. The multiprocessor data server of claim 23, further comprising P server threads, wherein said P server threads are bound to specific ones of the second through Nth processors.

26. The multiprocessor data server of claim 24, further comprising P server threads, wherein said P server threads are bound to specific ones of the second through Nth processors.

27. The multiprocessor data server of claim 23, further comprising first level and second level caches for each of said N processors, wherein instructions and temporal data are stored in said second level caches of said N processors, and wherein non-temporal data is stored in first level caches of said N processors, bypassing the second level caches.

28. The multiprocessor data server of claim 24, further comprising first level and second level caches for each of said N processors, wherein instructions and temporal data are stored in said second level caches of said N processors, and wherein non-temporal data is stored in first level caches caches of said N processors, bypassing the second level caches.

29. The multiprocessor data server of claim 25, further comprising first level and second level caches for each of said N processors, wherein instructions and temporal data are stored in said second level caches of said N processors, and wherein non-temporal data is stored in first level caches caches of said N processors, bypassing the second level caches.

30. The multiprocessor data server of claim 26, further comprising first level and second level caches for each of said N processors, wherein instructions and temporal data are stored in said second level caches of said N processors, and wherein non-temporal data is stored in first level caches caches of said N processors, bypassing the second level caches.

31. A program storage device, readable by a machine, embodying a program of instructions executable by the machine to perform a method of providing scalability in a multiprocessor data server having N processors, wherein N is an integer greater than or equal to 2, the method comprising:
implementing N network interface cards (NICs), a first one of the N NICs being dedicated to receiving an incoming data stream;
binding an interrupt from the first one of the N NICs to a first one of the N processors;
binding an interrupt for an nth NIC to an nth processor, wherein 0<n<=N; and
binding a deferred procedure call (DPC) for the nth NIC to the nth processor, wherein 0<n<=N.

32. The program storage device of claim 31, the method further comprising tightly coupling M client connections to the nth processor via the nth NIC, wherein M is a positive integer.

33. The program storage device of claim 31, the method further comprising binding P server threads to specific ones of second through Nth processors, wherein P is a positive integer.

34. The program storage device of claim 32, the method further comprising binding P server threads to specific ones of second through Nth processors, wherein P is a positive integer.

35. The program storage device of claim 31, the method further comprising:
defining first and second level caches for each of the N processors;
storing instructions and temporal data in second level caches of the N processors; and
storing non-temporal data in first level caches of the N processors, bypassing the second level caches.

36. The program storage device of claim 32, the method further comprising:
defining first and second level caches for each of the N processors;
storing instructions and temporal data in second level caches of the N processors; and
storing non-temporal data in first level caches of the N processors, bypassing the second level caches.

37. The program storage device of claim 33, the method further comprising:
defining first and second level caches for each of the N processors;
storing instructions and temporal data in second level caches of the N processors; and
storing non-temporal data in first level caches of the N processors, bypassing the second level caches.

38. The program storage device of claim 34, the method further comprising:
defining first and second level caches for each of the N processors;
storing instructions and temporal data in second level caches of the N processors; and
storing non-temporal data in first level caches of the N processors, bypassing the second level caches.

* * * * *